United States Patent
Eastham et al.

(10) Patent No.: US 10,943,393 B2
(45) Date of Patent: Mar. 9, 2021

(54) THREE-DIMENSIONAL MODEL OPTIMIZATION

(71) Applicant: VERTEBRAE INC., Santa Monica, CA (US)

(72) Inventors: Garrett Eastham, Austin, TX (US); Tyler John Lindberg, Santa Monica, CA (US); Keith Cody Rives, Marina del Rey, CA (US); Kwun Yin Choy, Los Angeles, CA (US); Vincent Thomas Cacace, West Hollywood, CA (US)

(73) Assignee: Vertebrae Inc., Los Angeles, CA (US)

( * ) Notice: Subject to any disclaimer, the term of this patent is extended or adjusted under 35 U.S.C. 154(b) by 0 days.

(21) Appl. No.: 16/553,925

(22) Filed: Aug. 28, 2019

(65) Prior Publication Data
US 2020/0342665 A1    Oct. 29, 2020

Related U.S. Application Data

(63) Continuation of application No. 16/395,722, filed on Apr. 26, 2019, now Pat. No. 10,460,516.

(51) Int. Cl.
*G06T 17/20*    (2006.01)

(52) U.S. Cl.
CPC .......... *G06T 17/20* (2013.01); *G06T 2200/04* (2013.01)

(58) Field of Classification Search
None
See application file for complete search history.

(56) References Cited

U.S. PATENT DOCUMENTS

| | | |
|---|---|---|
| 6,208,347 B1 | 3/2001 | Migdal et al. |
| 7,742,061 B2 | 6/2010 | Chen |
| 10,665,037 B1 | 5/2020 | Brimhall et al. |
| 2002/0033819 A1 | 3/2002 | Bewley, Jr. et al. |
| 2006/0140473 A1 | 6/2006 | Brooksby et al. |
| 2010/0033484 A1 | 2/2010 | Kim et al. |

(Continued)

OTHER PUBLICATIONS

He, Jian, et al. "Rubiks: Practical 360-degree streaming for snnartphones." Proceedings of the 16th Annual International Conference on Mobile Systems, Applications, and Services. 2018 (Year: 2018).*

(Continued)

*Primary Examiner* — Diane M Wills
(74) *Attorney, Agent, or Firm* — Fish & Richardson P.C.

(57) ABSTRACT

Methods, systems, and apparatus, including computer programs encoded on computer storage media, for optimizing three-dimensional models. One of the methods includes determining, for a three-dimensional model of an object to be optimized, a plurality of points on the object that each have at least a threshold likelihood of being a focal point, the object having two or more regions each of which include one or more textures, one or more meshes, or both; identifying, from the two or more regions, one or more non-focal regions that i) each do not include any of the plurality of points, and ii) are a proper subset of the two or more regions; generating, using the one or more non-focal regions, an optimized three-dimensional model for the object with a smaller size less than a larger size of the three-dimensional model; and storing the optimized three-dimensional model in a non-volatile memory.

24 Claims, 6 Drawing Sheets

(56) References Cited

U.S. PATENT DOCUMENTS

| | | | |
|---|---|---|---|
| 2010/0201682 A1 | 8/2010 | Quan et al. | |
| 2012/0229445 A1* | 9/2012 | Jenkins | G06T 15/60 345/418 |
| 2013/0232005 A1* | 9/2013 | Torii | G06Q 30/0241 705/14.53 |
| 2014/0013228 A1 | 1/2014 | Hutten | |
| 2014/0105486 A1 | 4/2014 | Tamaazousti et al. | |
| 2016/0353146 A1* | 12/2016 | Weaver | H04N 21/2662 |
| 2017/0116735 A1 | 4/2017 | Aughey | |
| 2017/0316609 A1* | 11/2017 | Dunn | G06T 19/006 |
| 2018/0144535 A1* | 5/2018 | Ford | G06T 15/005 |
| 2018/0330480 A1* | 11/2018 | Liu | G06T 17/205 |
| 2019/0026938 A1* | 1/2019 | Fuscoe | G01C 11/02 |
| 2019/0340834 A1 | 11/2019 | Martinez Molina et al. | |
| 2019/0371073 A1 | 12/2019 | Harviainen | |

OTHER PUBLICATIONS

Jian He, et al.; "Rubiks: Practical 360-Degree Streaming for Smartphones", the University of Texas at Austin, USA, +Network Technology Lab, Huawei, China {jianhe,mubashir,lili}@cs.utexas.edu, {mark.lijin,frank.lifeng,phoebe.han}@huawei.com, MobiSys '18, Jun. 10-15, 2018, Munich, Germany, 13 pages.

Evgeny Kuzyakov and David Pio, "Next-generation video encoding techniques for 360 video and VR", Posted on Jan. 21, 2016 to Video Engineering, Virtual Reality, https://code.fb.com/virtual-reality/next-generation-video-encoding-technoques-for-360-video-an-vr/, 6 pages.

Chim, Jimmy, et al. "CyberWalk: a web-based distributed virtual walkthrough environment." IEEE Transactions on Multimedia 5.4 ( 2003): 503-515. (Year: 2003).

PCT International Search Report & Written Opinion in International Application No. PCT/US2019/052142 dated Dec. 4, 2019, 9 pages.

* cited by examiner

THREE-DIMENSIONAL MODEL OPTIMIZATION

CROSS-REFERENCE TO RELATED APPLICATIONS

This application is a continuation of U.S. application Ser. No. 16/395,722, filed Apr. 26, 2019, the contents of which are incorporated by reference herein.

BACKGROUND

Systems can use three-dimensional ("3D") models to represent objects. For instance, an augmented reality ("AR") system, virtual reality ("VR") system, or web browser can use 3D models to represent objects in the corresponding environment. The models might be outside a field of view and affect presentation of objects inside the field of view, e.g., a ball that is bouncing on a chair.

SUMMARY

This specification describes techniques, methods, systems, and other approaches for optimizing the creation, rendering, or both, of 3D models. For example, the 3D model can be a model of a product displayed through an application, such as a web browser or a dedicated application. A computing device, such as a mobile device, AR device, VR device, or another type of computer, can display the 3D model on a screen such as a mobile device screen, a computer screen, AR goggles, or VR goggles. A modelling system can collect viewing data for 3D model images, analyze the collected data, and optimize the 3D models based on the analysis of the collected data.

When viewing a 3D model, a viewer may have the ability to view various aspects of the model. The viewer can adjust the aspect of the model, for example, by using a computer mouse, a finger, or a stylus to interact with aspects of the model, or use another input mode to adjust presentation of the model. A viewer may be able to click and drag the model or press keyboard arrow keys to rotate the model. When using an AR or VR device, a viewer can adjust the aspect of the model, for example, by turning his head to look at various aspects of the model.

For example, a viewer looking at a 3D model of a backpack may initially be presented with a side view of the backpack. The viewer can click on the backpack and drag an input device, e.g., a computer mouse, in a vertical direction to view the bottom of the backpack. The viewer can click and drag to the left or right in order to view the sides of the backpack. The viewer can click and drag in another vertical direction in order to view the top of the backpack.

When viewing a 3D model, a viewer may have the ability to zoom in or out on the model. The viewer can zoom in on the model, for example, by using a computer mouse to click or double-click on aspects of the model or use any other appropriate method to zoom in on the model or a portion of the model. A viewer may be able to scroll a mouse wheel or click on an icon such as a magnifying glass in order to zoom in or out. For example, a viewer looking at a 3D model of a backpack may zoom in to see the texture of the backpack, or to see features of the backpack, for instance enclosure devices such as zippers or buttons.

Different viewers of a 3D model may have different viewing patterns when looking at a 3D model. For example, one viewer may rotate a 3D backpack model to a left side view, and then zoom in on the left side view. Another viewer may rotate the 3D backpack model to the top view, and zoom in on the top view, e.g., before performing other interactions with the 3D backpack model.

The modelling system can receive data on viewers' interactions with a 3D model, e.g., when a viewer opts in to provide this data to the modelling system. For instance, the modelling system can receive data regarding a viewer's interactions with a 3D model. The data can represent a point of view of the 3D model from the viewer's perspective, the portions of the model presented on a display to the viewer, an order in which portions of the model were presented on the display, or a combination of two or more of these.

After receiving the data, the modelling system can analyze the viewing data, e.g., when the session in which the viewer interacted with the 3D model is over. The data may indicate, for example, that a viewer spent 10 seconds looking at the front view of the backpack, then 20 seconds looking at the left side view of the backpack, zoomed in on the left side view that includes the water bottle pocket for 10 seconds, then spent 30 seconds looking at the rear view that includes the straps of the backpack.

The modelling system can receive, aggregate, or both, data for every viewer of the 3D model or a subset of viewers of the 3D model. The modelling system can use the data to optimize the 3D model. For example, the modelling system can use the aggregated data to identify regions of the 3D model on which viewers focused more than other regions of the 3D model. Some examples of regions include meshes, textures, quadrants, other components of a 3D model, or a combination of two or more of these.

A region can be, for example, a perspective view of a 3D model, such as a left side view or right side view. For instance, when a perspective view is a region, the perspective view may include the textures, meshes, or both, of the 3D model that are displayed in a particular perspective view on which viewers likely focused more than other textures, meshes, or both, of the 3D model. Each region can be included in one or more perspective views. Each perspective view can include one or more regions, e.g., that may be included in other perspective views.

For an example 3D model of a backpack, an image of the 3D model, e.g., presented to a viewer, may depict a left side view that includes the water bottle pocket. The image may also depict textures and meshes of the straps and the zipper enclosure. The image might not depict any textures and meshes of an umbrella pocket on the right side of 3D model, a logo on the left side of the backpack, or both. The logo might not be presented in the left side view because, for example, the logo is behind the water bottle pocket, the actual textures and meshes for the logo might or might not be loaded in the 3D model, or both. In this example, a perspective view, e.g., as a region, can include at least a portion of the water bottle pocket, at least a portion of the straps and at least a portion of the zipper enclosure, and might not include the umbrella pocket, the logo, or both.

In some examples, when a perspective view is a region, the perspective view can include non-contiguous portions of the 3D model. For instance, the perspective view may include the water bottle pocket and the zipper enclosure even though the water bottle pocket and the zipper enclosure are separated by other areas of the 3D model, e.g., that are not displayed in the perspective view.

To identify the regions of the 3D model on which viewers focused more than other regions, the modelling system can perform cluster analysis on data from viewer interactions. The cluster analysis can be on aggregated data, can generate aggregated data, or both. For example, the modelling system can perform cluster analysis by creating a heat map of the 3D model. A heat map can represent the regions of the 3D model with various patterns, shading, colors, or all of these, to differentiate regions on which viewers focused more than other regions.

The modelling system can use the heat map to optimize the 3D model. For instance, the modelling system, e.g., a model optimization device, can optimize one or more regions of the 3D model using the identified regions on which viewers focused more than other regions of the 3D model. For the regions of the 3D model on which viewers focused less than other regions, the modelling system can generate lower resolution images from higher resolution images.

In some implementations, the modelling system can generate two or more versions of the 3D model. Each version of the 3D model can be a different data size, e.g., in megabytes, resolution, or both. A smaller-sized model can include the regions of the 3D model on which viewers focused more than other regions of the 3D model, e.g., as determined by the heat map, in high resolution. The smaller-sized model can include regions of the 3D model on which viewers focused less than other regions of the 3D model in low resolution. A larger-sized model can include high resolution data for the regions of the 3D model on which viewers focused less than other regions of the 3D model, and the regions of the 3D model on which viewers focused more than other regions of the 3D model, e.g., of all regions of the 3D model.

By optimizing 3D models, the modelling system can optimize presentation of 3D models. For instance, when a region of the 3D model of a certain backpack on which viewers focused more than other regions of the 3D model is the left side view showing the water bottle holder, the modelling system can optimize the 3D model so that the left side view has a higher resolution than the other regions of the 3D model, loads first during presentation of the 3D model, or both. This optimization of the 3D model may cause a device presenting the 3D model, e.g., on a display, to present the optimized 3D model more quickly compared to a non-optimized 3D model. The modelling system can program the high resolution images of regions of the 3D model on which viewers focused less than other regions of the 3D model to load after the initial version loads.

In some implementations, a system may render different quality regions of a 3D model based on a starting orientation of the 3D model. For instance, a system may load a first higher quality, e.g., fidelity, region based on the starting orientation of the 3D model in reference to content that will initially be presented on a display. The system may load a second lower quality region that will not be presented initially, e.g., based on the starting orientation. For example, for webpage of a camera that initially depicts the front region of the 3D model of the camera when the page loads, a system, e.g., a rendering system, may determine to load the front region of the 3D model in higher resolution while loading the unseen rear region in lower resolution.

In some implementations, the modelling system may optimize categories, e.g., product categories, of 3D models. For example, viewing data may indicate that, for a threshold amount of viewers of a certain hiking shoe model, the sole of the shoe is a region of the 3D model on which viewers focused more than other regions of the 3D model. The modelling system can use this data to optimize 3D models for product categories. For example, the modelling system can use data from a certain hiking shoe model to optimize 3D models for product categories such as all hiking shoes by a particular manufacturer, all hiking shoes, and/or all shoes. The modelling system can optimize the 3D models of the shoes so that the soles have a higher resolution than the rest of the 3D models, load first during presentation of the 3D models, or both.

In some examples, data may indicate that at least a threshold amount of viewers of a collared shirt zoom in on the collar of the shirt. The modelling system can use the data to optimize 3D models for product categories, e.g., 3D models for multiple collared shirts, e.g., all collared shirts, or potentially all clothing tops in general.

In some implementations, the modelling system may optimize categories of 3D models based on categories of viewers. A category of viewers can include a single user, e.g., John, or multiple viewers. For example, viewing data of a 3D model of a pillow may indicate that, for a threshold amount of viewers with a certain demographic feature, e.g., physical geographic location, the back of the pillow is a region of the 3D model on which the viewers focused more than other regions of the 3D model. The modelling system can use this data to optimize 3D models for viewer categories, e.g., when viewers opt to share categorical information such as physical geographic location. For example, the modelling system can use data from the pillow model to optimize 3D models for viewer categories such as all viewers in a particular physical geographic location. The modelling system can optimize the 3D models of the pillow so that the back of the pillow has a higher resolution than the rest of the 3D model, loads first during presentation of the 3D models, or both.

The modelling system can generate different 3D models of the pillow for different viewer categories, e.g., physical geographic locations, and provide one of the different 3D models to a device using data about the viewer category. For instance, when the modelling system receives a request for a 3D model of the pillow from a first physical location, the modelling system can provide a first 3D model. When the modelling system receives a request from a 3D model of the pillow from a second, different physical location, the modelling system can provide a second, different 3D model.

In general, one innovative aspect of the subject matter described in this specification can be embodied in methods that include the actions of determining, for a three-dimensional model of an object to be optimized, a plurality of points on the object that each have at least a threshold likelihood of being a focal point, the object having two or more regions each of which include one or more textures, one or more meshes, or both; identifying, from the two or more regions, one or more non-focal regions that i) each do not include any of the plurality of points, and ii) are a proper subset of the two or more regions; generating, using the one or more non-focal regions, an optimized three-dimensional model for the object with a smaller size less than a larger size of the three-dimensional model; and storing the optimized three-dimensional model in a non-volatile memory. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of determining, for a three-dimensional model of an object to be optimized, a plurality of points on the object that each have at least a threshold likelihood of being a focal point, the object having two or more regions each of which include one or more textures, one or more meshes, or both; identifying, from the two or more regions, one or more focal regions that i) each include at least one of the plurality of points, and ii) are a proper subset of the two or more regions; generating, using the one or more focal regions, an optimized three-dimensional model for the object with a smaller size less than a larger size of the three-dimensional model; and storing the optimized three-dimensional model in a non-volatile memory. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include receiving, across a network, a request for a model of the object; and in response to receiving the request for the model of the object, transmitting, to a device and using the network, the optimized three-dimensional model for the object. The method may include, after sending the optimized three-dimensional model with the smaller size to the device, determining to send the three-dimensional model with the larger size to the device; and in response to determining to send the three-dimensional model with the larger size to the device, sending, to the device, the three-dimensional model.

In some implementations, determining to send the three-dimensional model with the larger size to the device may include determining that a network connection across the network and between the system and the device has less than a threshold amount of use. Sending, to the device, the three-dimensional model may be responsive to determining that the network connection across the network and between the system and the device has less than the threshold amount of use. Determining to send the three-dimensional model with the larger size to the device may include receiving a request for the three-dimensional model with the larger size. Sending, to the device, the three-dimensional model may be responsive to receiving a request for the three-dimensional model with the larger size.

In some implementations, generating the optimized three-dimensional model may include reducing, for each of the one or more non-focal regions, a quality of the one or more textures, the one or more meshes, or both, included in the respective non-focal region from a quality of the corresponding textures, one or more meshes, or both, in the three-dimensional model. Reducing, for each of the one or more non-focal regions, the quality of the one or more textures, one or more meshes, or both, included in the respective non-focal region from the quality of the corresponding textures, one or more meshes, or both, in the three-dimensional model may include reducing, for each of the one or more non-focal regions, a resolution of each of the one or more textures, one or more meshes, or both, included in the respective non-focal region from a higher resolution of the corresponding texture, one or more meshes, or both, in the three-dimensional model.

In some implementations, identifying, from the two or more regions, the one or more non-focal regions may include identifying, as the one or more non-focal regions, one or more textures, one or more meshes, or one or more quadrants; and generating the optimized three-dimensional model may include generating, using the identified one or more textures or the identified one or more meshes or the identified one or more quadrants, the optimized three-dimensional model for the object with a smaller size less than a larger size of the three-dimensional model.

In some implementations, determining the plurality of points on the three-dimensional model that each have at least a threshold likelihood of being a focal point may include: retrieving, from a memory, data for a plurality of images of the object that each depict at least a portion of a view of the object that was generated on a display for presentation to a viewer; determining, for each image from the plurality of images, one or more potential focal points; and selecting, from the one or more potential focal points for the plurality of images and as the plurality of points, the potential focal points that each have at least the threshold likelihood of being a focal point.

In some implementations, selecting the potential focal points that each have at least the threshold likelihood of being a focal point may include: selecting a first subset of potential focal points i) from the multiple potential focal points depicted in a first image from the plurality of images ii) that each have at least the threshold likelihood of being a focal point; and determining to skip selection of a second subset of potential focal points a) from the multiple potential focal points depicted in the first image from the plurality of images b) that each do not have at least the threshold likelihood of being a focal point.

In some implementations, each of the potential focal points may include an estimated point in the corresponding image from the plurality of images on which a viewer, viewing the presentation of the object on the display, was likely focused. Selecting, from the one or more potential focal points for the plurality of images, the potential focal points that each have at least the threshold likelihood of being a focal point may include: weighting at least one of the one or more potential focal points using a distance of the potential focal point from a center of the corresponding image. A first potential focal point that is closer to the center of the corresponding image has a higher weight than a second potential focal point that is further away from the center of the corresponding image.

In some implementations, the method may include: receiving, from a device that presented a model of the object on the display and across a network, data for one or more of the plurality of images; and storing the data for one or more of the plurality of images in the memory.

In some implementations, determining, for each image from the plurality of images, the one or more potential focal points may include: projecting, for each image from the plurality of images and from a direction represented by a camera that would generate the respective image, one or more rays onto the object; and selecting, for each of the one or more rays, a point at which the ray intersects with the object as a corresponding focal point. Projecting, for each image from the plurality of images and from a direction represented by a camera that would generate the respective image, the one or more rays onto the object may include: for each image from the plurality of images: determining one or more regions within which to generate a ray; and randomly generating, for each of the one or more regions, a ray that projects onto the object.

In some implementations, for each image from the plurality of images, determining the one or more regions within which to generate a ray may include determining, for each of the one or more regions, an angle deviation range from a reference point within which to generate a ray. Randomly generating, for each of the one or more regions, the ray that projects onto the object may include, for each of the one or more regions: randomly selecting an angle deviation within the angle deviation range; and generating a ray at the randomly selected angle deviation. The reference point may include a position of the camera that would generate the respective image. Determining, for each of the one or more regions, an angle deviation range may include: determining, for each of the one or more regions, a size of the angle deviation ranges using a distance of the region from the center of the corresponding image.

In some implementations, selecting, from the one or more potential focal points for the plurality of images, the potential focal points that each have at least the threshold likelihood of being a focal point may include: determining, for one or more points on the object, a quantity of times the point is a potential focal point for a corresponding image; and selecting, as the plurality of points, the potential focal points for which the corresponding quantity satisfies a threshold amount. Selecting, as the plurality of points, the potential focal points for which the corresponding quantity satisfies a threshold amount may include: determining, for the one or more points on the object, a normalized quantity using a highest quantity of times a point on the object was a potential focal point; and selecting, as the plurality of points, the potential focal points for which the corresponding normalized quantity satisfies a threshold value. Determining the plurality of points on the object that each have at least the threshold likelihood of being a focal point may include determining the plurality of points on the object that each have at a weight that satisfies a threshold weight.

In some implementations, a first region and a second region may each have a first texture; a third region from the two or more regions has a second texture, different from the first texture; and identifying, from the two or more regions, one or more focal regions may include identifying the first region as a focal region that includes a point from the plurality of points that has at least the threshold likelihood of being a focal point. The second region may not include any points from the plurality of points that each have at least the threshold likelihood of being a focal point. Generating, using the one or more focal regions, the optimized three-dimensional model for the object may include generating, using the one or more focal regions, the optimized three-dimensional model for the object that has a higher quality for the first region and the second region that is greater than a lower quality for the third region.

In some implementations, the method may include determining that the second region does not include any points from the plurality of points that each have at least the threshold likelihood of being a focal point. Identifying, from the two or more regions, the one or more focal regions may include identifying, as the one or more focal regions, one or more textures, one or more meshes, or one or more quadrants; and generating the optimized three-dimensional model may include generating, using the identified one or more textures or the identified one or more meshes or the identified one or more quadrants, the optimized three-dimensional model for the object with a smaller size less than a larger size of the three-dimensional model.

The subject matter described in this specification can be implemented in various embodiments and may result in one or more of the following advantages. In some implementations, generation of smaller size, optimized 3D models can enable a modelling system to reduce storage requirements for a 3D model, reduce network usage, e.g., when transmitting a 3D model to another device or system, or both. By optimizing 3D models, the time for the 3D model to load on the screen of the device can be decreased. The device can first load the smaller optimized 3D model, containing higher resolution data for only the non-optimized regions, and lower resolution data for the optimized regions. The device can then, optionally, load the higher resolution data for the 3D model, e.g., when the device later receives the higher quality 3D model from the modelling system. This can improve load times, improve 3D model quality, e.g., by maintaining certain areas with a higher focus in a higher resolution rather than using a 3D model that includes only lower resolution content, decrease the required bandwidth for transmitting 3D model data, e.g., from the modelling system to the device, or a combination of two or more of these. In some implementations, a modelling system can determine to use a smaller size 3D model when network quality is detected as lower on the device accessing the 3D model. For example, the modelling system may determine to serve a lower quality 3D model to a device accessing a webpage on a 3G network compared to a device accessing a webpage on a Wi-Fi connection.

In some implementations, a modelling system can determine to use a combination of lower quality 3D data and higher quality 3D data. For example, the modelling system can selectively load the combination of lower quality 3D data and higher quality 3D data prior to the beginning of a viewing session based on previous data collection. The modelling system can selectively load and/or update the combination of lower quality 3D data and higher quality 3D data during a viewing session, e.g., based on viewer interactions. This technique can improve load times for a device, e.g., accessing the webpage on a lower quality network.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
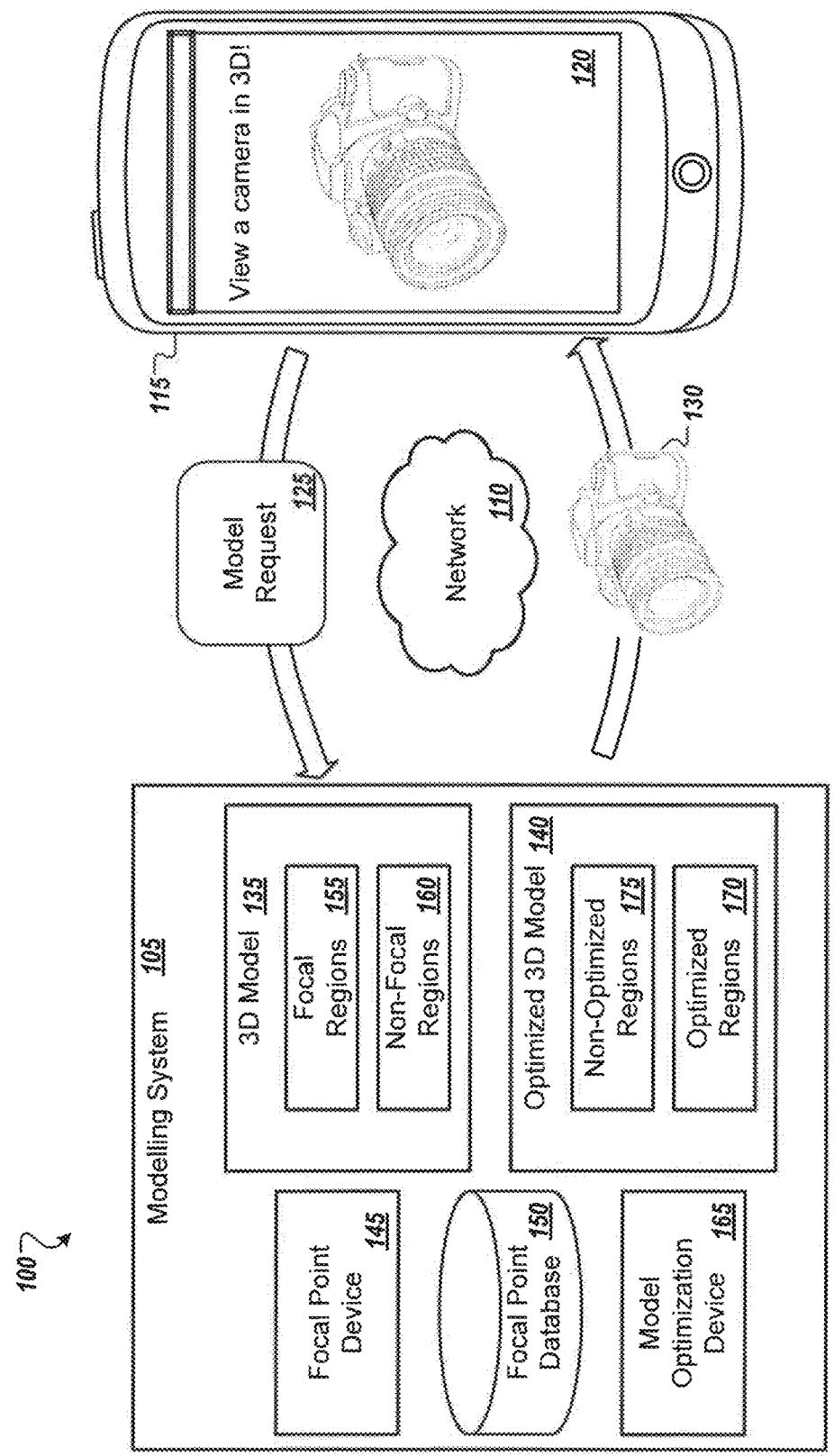
FIG. 1 is an example of an environment for generating an optimized 3D model.

FIG. 1 is an example of an environment 100 for generating an optimized 3D model. A 3D model is a three-dimensional representation of an object in a 3D space. The environment 100 has two components: a modelling system 105 and a device 115. The modelling system 105 can generate 3D models, optimize 3D models, or both. The device 115 can display 3D models, optimized 3D models, or a combination of both at different times, on a display 120. The environment 100 can include a network 110 that can transmit 3D models between the modelling system 105 and the device 115.

In the example in FIG. 1, the modelling system 105 can receive a model request 125 from the device 115 over the network 110. The model request 125 is a request for the modelling system 105 to send a 3D model 130 to the device 115 to enable the device 115 to display the 3D model 130 on the display 120. In this example, the modelling system 105 receives a model request 125 to send a 3D model 130 of a camera to the device 115.

The modelling system 105 can store 3D models in a database, e.g., any appropriate type of database. The 3D models can be 3D models 135, e.g., non-optimized 3D models, optimized 3D models 140, or both. One example of an optimized 3D model 140 is the 3D model 130 of a camera. The 3D models 135, the optimized 3D models 140, or both, can include regions.

A region of a 3D model can be one or more textures, one or more meshes, a quadrant, or other components of a 3D model, to name a few examples. A region can be, for example, a perspective view of a 3D model, such as a left side view or right side view. For instance, when a perspective view is a region, the perspective view may include the textures and meshes of the 3D model that are displayed in a particular perspective view on which viewers likely focused more than other textures and meshes of the 3D model. For the 3D model 130 of the camera, the regions can be, for example, a front view, a right side view, a left side view, a top view, a bottom view, and a rear view of the camera.

In some examples, a perspective view can include one or more regions. Each region can be included in one or more perspective views. Each perspective view can include one or more regions, e.g., that may be included in other perspective views.

For an example 3D model of a camera, an image of the 3D model, e.g., presented to a viewer, may depict a left side view that includes the shutter release button. The image may also include textures of the lens. The image might not include any textures of the zoom operator on the right side of 3D model, for example, if those textures are behind other regions of the 3D model, such as the lens. In this example, a perspective view, e.g., as a region, may include the shutter release button and the lens, while not including the zoom operator because the zoom operator is not depicted in the image.

Each region of a 3D model can include one or more textures. The 3D model 130, 135 can include any appropriate number of textures, e.g., determined during generation of the 3D model 130, 135. A texture can be an image file containing visual detail that is applied to a polygon within a 3D model 135. For example, a texture on the front region of the 3D model 130 of the camera can be the image of the lens of the camera. A texture on the top region of the 3D model 130 of the camera can be the image of the flash mount of the camera.

Each region of the 3D model 130, 135 can include one or more meshes. A mesh can be a polygon, such as a triangle, defined by collections of points in a 3D space defined by 3D axes. One or more textures can be applied to, i.e. wrapped over, each mesh. Greater numbers of meshes can result in increased image resolution.

The modelling system 105 can include a focal point device 145. The focal point device 145 can determine focal points for the 3D model 135, as discussed in more detail below. A focal point can be an estimated point on a 3D model on which one or more viewers, viewing the 3D model, were likely focused, e.g., based on an image displayed to the viewer. For example, when a viewer of the 3D model 130 of the camera is shown a top region of the camera that includes a viewfinder and, separately, a bottom region of the camera that includes the battery compartment, the modelling system 105 may determine that the 3D model has two focal points, e.g., for this viewer. A first focal point may be the on the viewfinder while a second focal point may be on the battery compartment. The modelling system 105 can use a center point of an image, e.g., presented on a display, to determine a focal point. In some implementations, there might not be any eye-tracking of the viewer.

The modelling system 105, e.g., the focal point device 145, can store the identified focal points in a focal point database 150. Each of the focal points corresponds to, e.g., is included in, a region of the 3D model 135. The focal point database 150 may include a mapping that indicates, for each of the identified focal points, the region of the 3D model 135 to which the focal point corresponds. The focal point database 150 can include data for each potential focal point of the 3D model 135 or a proper subset of potential focal points of the 3D model 135, e.g., when the modelling system 105 determines that only some potential focal points were likely focal points for a viewer.

The modelling system 105 can categorize regions of the 3D model 135 based on the focal points that correspond to the region, e.g., can store data in the focal point database 150 that indicates whether the regions are focal regions 155 or non-focal regions 160. The database 150 may include data only for focal regions 155, only for non-focal regions 160, or for both.

The modelling system 105 can use any appropriate method to determine focal regions 155, non-focal regions 160, or both. In some implementations, the modelling system 105 can determine weights for each focal point and categorize a region using the weights for the focal points in the region, as discussed in more detail below. In some examples, the modelling system 105, e.g., the focal point device 145 or the model optimization device 165, can categorize regions of the 3D model 135 that contain more than a threshold number of focal points as focal regions 155. The modelling system 105, e.g., the focal point device 145 or the model optimization device 165, can categorize regions of the 3D model 135 that contain less than a threshold number of focal points as non-focal regions 160. For example, a focal region 155 of the 3D model 130 of the camera may be the front of the camera, which includes the likely focal points for the lens and zoom ring. Each of the lens and the zoom ring may have multiple likely focal points, e.g., based on the size, number of textures, or both, of the lens and the zoom ring, respectively. A non-focal region 160 of the 3D model 130 of the camera may be the bottom of the camera, if it contains less than the threshold number of focal points.

The threshold number of focal points may be any appropriate threshold. For instance, the modelling system 105 may determine the threshold number of focal points using a size of the 3D model, e.g., in bytes or dimensions, a number of textures, meshes, or both, in the 3D model, or a combination of two or more of these. The threshold number of focal points can be determined as a function of the total number of focal points for the 3D model. For example, a 3D model with more focal points will have a higher threshold number of focal points compared to a 3D model with fewer focal points. The function may be linear or non-linear. Additional details regarding focal point analysis are described below.

In some implementations, the modelling system 105 can determine potential focal points. As described in more detail below, the modelling system 105 can use the potential focal points to determine whether a region should be categorized as a focal region 155 or a non-focal region 160. For example, a non-focal region 160 may have less than or not more than a threshold minimum value of potential focal points. A focal region 155 may have not less than or more than the threshold minimum value of potential focal points.

The model optimization device 165 uses the focal points within the focal point database 150, the regions to which the focal points correspond, or both, to generate an optimized 3D model 140 that has a smaller size compared to the 3D model 135. The optimized 3D model 140 can be smaller than the 3D model 135 when measured by data size, e.g., in megabytes, resolution, or both.

To generate the optimized 3D model 140, the model optimization device 165 can reduce the quality of textures within non-focal regions 160. To reduce the quality of textures within non-focal regions 160, the model optimization device 165 reduces the resolution of each of the textures in the non-focal region 160 from a higher resolution of the corresponding texture in the 3D model 135. The model optimization device 165 may use any appropriate method to reduce the resolution of the textures. By reducing the quality of textures in non-focal regions 160, the model optimization device 165 produces optimized regions 170.

The model optimization device 165 can process data for the focal regions 155 or determine to skip processing data for the focal regions 155 of the 3D model 135. For instance, the model optimization device 165 might not reduce the quality of textures within focal regions 155, e.g., the model optimization device 165 can determine to not process textures for the focal regions 155. In some examples, the model optimization device 165 can reduce a quality of textures for the focal regions 155 less than an amount by which the model optimization device 165 reduces a quality of the textures for the non-focal regions 160. This ensures that the textures for the focal regions 155 are likely to have a higher quality than textures for the non-focal regions 160. The focal regions 155 become non-optimized regions 175 within the optimized 3D model 140.

The optimized 3D model 140 includes both optimized regions 170 and non-optimized regions 175. The model optimization device 165 stores the optimized 3D model 140 in a non-volatile memory within the modelling system 105. The optimized 3D model 140 is smaller than the 3D model 135, due to the textures within the optimized regions 170 having a reduced quality, e.g., resolution.

The modelling system 105 can generate the optimized 3D model 140 from the 3D model 135 at any appropriate time. For instance, the modelling system 105 can generate the optimized 3D model 140 upon receipt of viewer data, e.g., used to determine focal points. In some examples, the modelling system 105 can generate the optimized 3D model 140 upon receipt of the model request 125.

In response to receiving the model request 125, the modelling system 105 can transmit the optimized 3D model 140, e.g., as the 3D model 130, to the device 115 using the network 110. The device 115 can then display the 3D model 130 on the display 120. Presentation of the 3D model 130 on the display 120 shows the 3D model 130 of the camera with higher resolution textures in non-optimized regions 175, and lower resolution textures in optimized regions 170. For example, the front view of the camera may correspond to a non-optimized region 175 and have a higher resolution, while the bottom view of the camera may correspond to an optimized region 170 and have a lower resolution.

In some implementations, the non-optimized regions 175 can load before the optimized regions 170 during presentation on the display 120. For example, the 3D model 130, as an optimized 3D model 140, can include load data that indicates an order by which a presenting device should load regions of the 3D model 130 for presentation. The load data can indicate that the presenting device, e.g., the device 115, should begin by loading the non-optimized regions 175, e.g., the front of the camera, and then load the optimized regions 170, e.g., the bottom of the camera.

After sending the optimized 3D model 140 to the device 115, the modelling system 105 can determine whether to send the higher quality 3D model 135 to the device 115. The determination to send the 3D model 135 to the device 115 can be based on the size of the 3D model 135, usage of the network 110 between the modelling system 105 and the device 115, e.g., network 110 bandwidth, or both. If the network 110 has less than a threshold amount of use, and has available bandwidth, the modelling system 105 can send the larger 3D model 135 to the device 115.

By optimizing 3D models, the time for the 3D model to load on the display 120 of the device 115 can be decreased. The device 115 can first load the smaller optimized 3D model 140, containing high resolution data for only the non-optimized regions 175, and low resolution data for the optimized regions 170. The device 115 can then, optionally, load the high resolution data for the 3D model 135, e.g., when the device 115 later receives the higher quality 3D model 135 from the modelling system 105. This can improve load times, improve 3D model quality, e.g., by maintaining certain areas with a higher focus in a higher resolution rather than using a 3D model that includes only lower resolution content, decrease the required bandwidth for transmitting 3D model data, e.g., from the modelling system 105 to the device 115, or a combination of two or more of these.

In some implementations, regions of the 3D model 130 can include combinations of high resolution data and low resolution data. For example, the 3D model 130 may include a combination of high resolution data and low resolution data for some of the regions. In some examples, the 3D model 130 may include a combination of high resolution data and low resolution data for each of the regions.

High resolution data can include more and/or smaller meshes for a region, while low resolution data can include fewer and/or larger meshes for the region. Based on viewer interactions, available network bandwidth, and available processing resources, or a combination of two or more of these, a system, e.g., a rendering system on the device 115, can select and use high resolution data or low resolution data for various regions of the 3D model 130. The system can dynamically change the quality of a region, e.g., based on using high resolution data or low resolution data, before or during a viewing session.

In some implementations, the modelling system 105 can send the low resolution data and high resolution data for some regions at the same time, can send the low resolution and high resolution data for some regions when needed, can send some low resolution data and then some high resolution data for some regions, or a combination of two or more of these. Subsequent high resolution data may be sent all at once or in separate messages. For example, the 3D model 130 may initially load with a certain region in low resolution. As the device 115 presents the 3D model 130, the device 115 can replace the low resolution data with high resolution data, e.g., to improve the quality of content presented on the display 120. In this way, the device 115 can dynamically update the 3D model 130 during presentation.

In some implementations, the modelling system 105 can determine, e.g., for a viewer session, focal point weights using viewer data, session browsing behavior, or both. The determination of focal point weights specific to the viewer session may enable the modelling system 105 to dynamically configure regions of the 3D model 130 specific to that viewer session, e.g., the device's 115 functionality, the network connection with the requesting device 115, the specific content presented by the requesting device 115, or a combination of two or more of these. For instance, the modelling system may dynamically determine low resolution data, medium resolution data, high resolution data, or a combination of two or more of these, for some regions, based on the focal point weights. In some implementations, the modelling system can generate and cache pre-customized versions of the 3D model 130 based on focal points weights and select one of the pre-customized versions of the 3D model 130 for individual viewers and/or individual viewing sessions.

For example, if the device 115 presents multiple different 3D models within a certain category, such as shirts, during a browsing session, the modelling system 105 can dynamically configure regions of 3D models 130 of shirts based on the content presented during the browsing session, e.g., the particular viewing angles of the multiple different 3D models presented during the browsing session. The modelling system 105 can send low resolution data for the regions of shirts that include low-weighted focal points for the session. The modelling system can send high resolution data for the regions of shirts that include high-weighted focal points for the session.

In some implementations, a 3D model 130 can include multiple regions with the same texture or textures. For instance, when a 3D model 130 of a camera includes a lens, the 3D model 130 may include a first region on the top of the lens with a particular texture and a second region on the bottom of the lens with the particular texture. The modelling system 105 can determine to optimize a repeated texture, e.g., the particular texture, in specific individual regions, e.g., the bottom of the lens, or in all regions that include the repeated texture. In some examples, the modelling system 105 may optimize the repeated texture only when that repeated texture is not included in a focal region 155. In some implementations, the modelling system 105 can determine not to optimize a repeated texture, e.g., the particular texture, if they are located in one or more focal regions 155, e.g., the top of the lens.

The modelling system 105 is an example of a system implemented as computer programs on one or more computers in one or more locations, in which the systems, components, and techniques described in this document are implemented. The devices 115 may include personal computers, mobile communication devices, augmented reality ("AR") goggles, virtual reality ("VR") goggles, and other devices that can send and receive data over the network 110. The network 110, such as a local area network (LAN), wide area network (WAN), the Internet, or a combination thereof, connects the devices 115 and the modelling system 105.

The modelling system 105 may use a single server computer or multiple server computers operating in conjunction with one another, including, for example, a set of remote computers deployed as a cloud computing service. The modelling system 105 can include several different functional components, including the focal point device 145, and the model optimization device 165. The various functional components of the modelling system 105 may be installed on one or more computers as separate functional components or as different modules of a same functional component. For example, the focal point device 145 and the model optimization device 165 of the modelling system 105 can be implemented as computer programs installed on one or more computers in one or more locations that are coupled to each through a network. In cloud-based systems for example, these components can be implemented by individual computing nodes of a distributed computing system.

Figure 2:
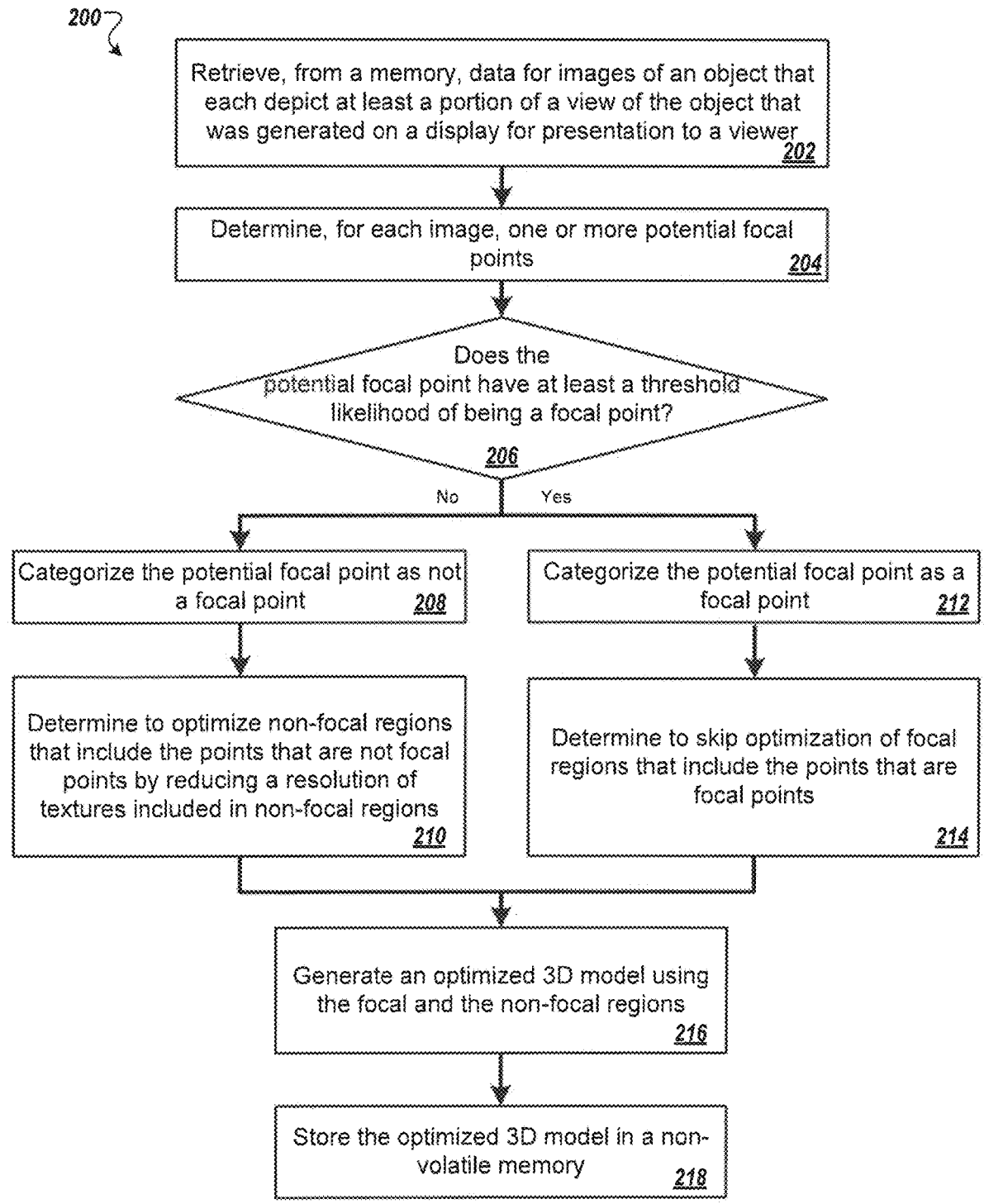
FIG. 2 is a flow diagram of a process for generating an optimized 3D model.

FIG. 2 is a flow diagram of a process 200 for generating an optimized 3D model. For example, the process 200 can be used by the modelling system 105 from the environment 100. In some examples, some of the steps of the process 200 may be performed by the focal point device 145, the model optimization device 165, or both, in the modelling system 105.

A modelling system retrieves, from a memory, data for images of an object that each depict at least a portion of a view of the object that was generated on a display for presentation to a viewer (202). Data for images can be, for example, a virtual camera's position, orientation, focal length, or a combination of two or more of these. In some examples, data for images can be an object's position and orientation, e.g., with respect to the virtual camera.

The object can have two or more regions, each of which can include one or more textures. The images of the object can depict various portions of views of the object that were displayed to a viewer, portions of views of the object that were displayed to multiple viewers, or both. For instance, the modelling system, or another system, may provide a 3D model of the object to a device. The device may present one or more views of the object using the 3D model. The device may capture data representing these views, e.g., as the images.

For a 3D model of a camera, the regions can be, for example, a front region, a right side region, a left side region, a top region, a bottom region, and a rear region of the camera. An example texture on the top region of the 3D model of the camera can be the image of the flash mount of the camera, while an example texture on the bottom region of the 3D model of the camera can be the image of the battery compartment.

During example viewer interactions, a first viewer may view the top region, including the flash mount texture, and the bottom region, including the battery compartment texture. A second viewer may view only the top region, including the flash mount texture, from a different angle compared to the first viewer. The modelling system can retrieve first data for the top and bottom views from the first viewer interaction, and second data for the top view from the second viewer interaction.

In some examples, the images can be from multiple viewer sessions. For instance, a first viewer can view the 3D model of the camera during a first session. A second viewer, or the first viewer, can view the 3D model of the camera during a second session that is a different session than the first session.

In some implementations, the data for the images can be from viewer sessions within a studio such as a physical VR studio. For example, a viewer can participate in a VR experience of looking at and interacting with 3D models of products, e.g., at a retail store.

In some implementations, a system can randomly generate various combinations of meshes and textures, e.g., potentially optimized meshes, textures, or both. The system can display the combinations to viewers and receive feedback data. In some examples, system can collect load time data for some of the combinations of meshes and textures. The modelling system can use the data to determine which combinations of meshes and textures to optimize.

The modelling system determines, for each image, one or more potential focal points (204). Each of the potential focal points can be an estimated point in a corresponding image from the images on which a viewer, viewing the presentation of the object on the display, was likely focused. An estimated point can be a point in the image, a point on the 3D model, or both. The modelling system can identify potential focal points using, for example, the focal point device 145 from the environment 100.

To identify potential focal points, the modelling system can project one or more rays from images of the 3D model of the object onto the 3D model. The modelling system can project the rays using a virtual camera's position, orientation, focal length, or a combination of two or more of these. The modelling system can determine the potential focal points using the virtual camera's position, orientation, and/or focal length; the 3D model's position, and/or orientation; or both. The images of the 3D model of the object can depict a field of view of the 3D model, e.g., a portion of the 3D model. The modelling system projects the rays from an image from a direction represented by a virtual camera, e.g., in a virtual world that includes the 3D model, that would generate the respective image for the viewer, e.g., for a field of view of the respective image.

Figure 3:
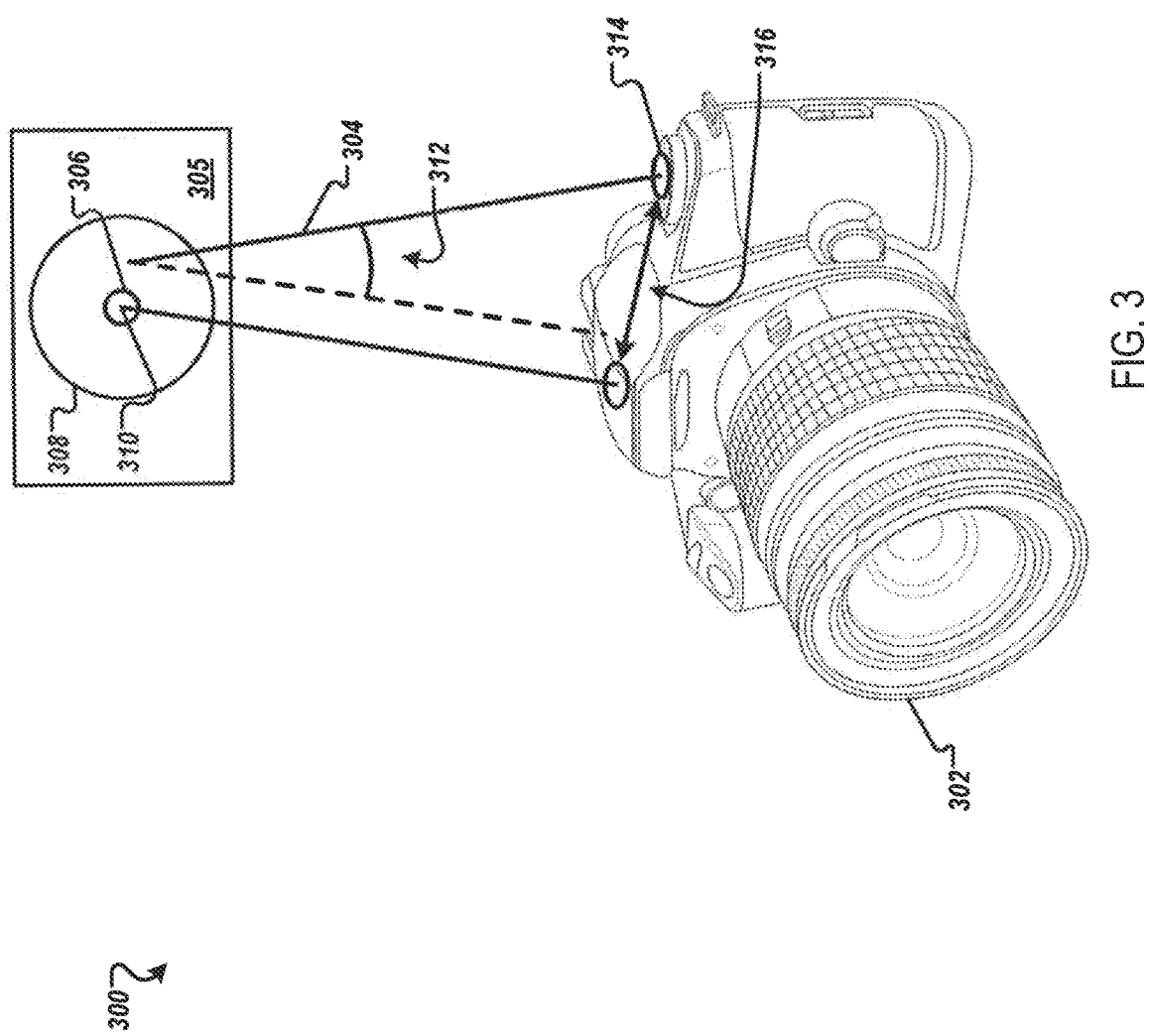
FIG. 3 is an illustration of an example environment that includes a 3D model with two rays projected from an image.

FIG. 3 is an illustration of an example environment 300 that includes a 3D model 302 with two rays 304 projected from an image 305. The modelling system may use the environment 300 for one or more of the images 305 to determine the potential focal points.

For instance, for each image, the modelling system can determine one or more regions 306, 308 within which to generate a ray 304 or multiple rays. To determine the regions 306, 308 within which to generate a ray 304, the modelling system can identify one or more reference points, a distance from a reference point, or both, to define the respective region. The modelling system can use a center of the image 305 as a reference point. In some examples, the modelling system can use a point in the left third of the image 305 as a reference point, e.g., a point centered in the left third of the image. In some examples, the modelling system can use a position of a virtual camera, which could be used to create the image 305, to determine a reference point. For instance, the modelling system can use a position of the virtual camera with respect to the image 305, the 3D model 302, or both, to determine a reference point.

The modelling system may determine any appropriate number of regions. For instance, a first region 306 can be circular and centered in the image 305. A second region 308 can be circular and centered in the image 305, e.g., having the same center 310 as the first region 306. The second region 308 can be non-overlapping with the first region 306, e.g., the second region 308 can be a toroid with a hole defined by the first region 306.

The modelling system can project rays from the image 305, toward the model 302 of the camera, at any appropriate angle. For example, the modelling system can determine an angle deviation range within which to generate a ray 304 based on the regions 306, 308 from which the ray 304 projects. The modelling system can determine a size of the angle deviation ranges using a distance of the region from the center 310 of the image 305. In some examples, regions closer to the center 310 may have a smaller angle deviation range than regions further from the center 310. The modelling system can randomly select an angle deviation 312 that is within the angle deviation range, and generate a ray 304 at the randomly selected angle deviation 312. The modelling system can select, for each ray 304, a point at which the ray intersects with the 3D model 302 as a corresponding potential focal point 314.

The potential focal point 314 can be any appropriate size. The modelling system can select the size of the potential focal points based on a resolution of the 3D model 302, a size of the 3D model, or any other appropriate data. For example, a potential focal point can be smaller or larger than the potential focal point 314 depicted in FIG. 3.

Referring back to FIG. 2, the modelling system determines, for each of the potential focal points, whether the potential focal point has at least a threshold likelihood of being a focal point (206). The modelling system can categorize a potential focal point that has at least the threshold likelihood of being a focal point as a focal point. For instance, the modelling system can store data in a memory, e.g., in a database implemented on a memory, that categorizes the potential focal point as a focal point.

To select the potential focal points 314 that have at least a threshold likelihood of being a focal point, the modelling system can weight potential focal points 314 using a distance 316 of the potential focal point 314 from a ray projected from the center 310 of the image 305, e.g., which ray does not have any angle deviation, or the distance 316 of the ray 304 used to determine the potential focal point 314 from the center 310 of the image 305. For instance, a potential focal point 314 that is closer to the center 310 of the corresponding image can have a higher weight compared to a potential focal point 314 that is further away from the center 310 of the image 305.

For example, when a viewer interacts with the 3D model of the camera, a system can predict that the viewer is focused on the center 310 of the image 305 as displayed on a screen. The system can predict that the viewer is also focused on a point that is displayed towards the edge of the screen. The system may determine that a first point that closer to the center 310 of the corresponding image is more likely to be a point on which the viewer was focused, compared to a second point that is further from the center 310 of the image. Because of this, the system can assign the first point a higher weight than the second point.

The likelihood that a point is a focal point can be based on the number of images in which a point is a potential focal point 314 during viewer interactions, the distance 316 between the potential focal point 314 and the center 310 of the images during viewer interactions, a weight for the potential focal point 314, or a combination of two or more of these.

For example, a first point may be displayed in the center 310 of ten images during viewer interactions. A second point that is located at a distance 316 from the center 310 of ten images may have a smaller likelihood of being a focal point, compared to the first point. Likewise, a third point that is the center 310 of only five images may have a smaller likelihood of being a focal point, compared to the first point. Alternatively, a fourth point that is in the center 310 of twenty images may have a higher likelihood of being a focal point, compared to the first point.

In some implementations, the modelling system can generate weights for potential focal points. For instance, the modelling system can generate a weighted focal point graph, a weighted region graph, or both. The modelling system can generate the weights, e.g., as described above, and create a graph that includes the weights. The graph can represent a 3D model and include a weight for each potential focal point in the 3D model. For instance, the graph may include a weight for a mesh, a vertex, an edge, or a combination of two or more of these.

The modelling system may use a weight threshold to determine a likelihood that a potential focal point, a region that includes a potential focal point, or both, is a focal point or a focal region. When the modelling system uses weights between zero and one, inclusive, the weight threshold can be 0.25. A weight may satisfy the threshold weight when the weight is greater than or equal to the threshold weight, or when the weight is greater than the threshold weight. In some examples, the weight may satisfy the threshold weight when the weight is less than or equal to the threshold weigh, or when the weight is less than the threshold weight, e.g., when lower values represent a higher likelihood of being a focal point.

For example, when a weight for a potential focal point satisfies weight threshold, the modelling system can determine that the potential focal point is a focal point. When a weight for a potential focal point included in a region satisfies a weight threshold, the modelling system can determine that the region is a focal region. In some examples, when a region includes multiple potential focal points, the modelling system may compare a combination of the weights of the multiple potential focal points with the weight threshold. For instance, the modelling system may compare an average weight or a sum of the weights with the weight threshold. The modelling system can use multiple weight thresholds when applying different levels of optimization for each of the weight thresholds.

In some implementations, the modelling system can cluster average weights to determine a focal point. For instance, the modelling system can determine a group of weights that each satisfy a weight threshold and are within a threshold distance from each other or other points in the group. The modelling system can determine the center of the group of weights, e.g., a point that is closest to the center, and categorize the center as a focal point. The modelling system can use the focal point as a focal region, categorize a larger region that surrounds the focal point as a focal region, or both.

In some implementations, the modelling system can generate weights, determine a weight threshold, or both, using a network bandwidth, device-specific capabilities, or both. For example, the modelling system can select a higher weight threshold for determining focal points and focal regions when the available network bandwidth for a device requesting a 3D model is lower than compared to a higher available network bandwidth. Similarly, the modelling system can select a higher weight threshold for a device with less processing power than a device with more processing power. This would result in fewer focal points and more optimized regions.

In some implementations, the modelling system may cluster the potential focal points to determine whether a point satisfies a threshold of being a focal point. For instance, the modelling system can generate aggregated viewing data using the potential focal points. The modelling system can use the aggregated viewing data to determine whether a potential focal point has at least a threshold likelihood of being a focal point. For example, the modelling system can perform cluster analysis by creating a heat map of the 3D model. A heat map can represent the regions of the 3D model with various patterns, shading, colors, or all of these, to differentiate regions on which viewers focused more than other regions.

In some implementations, the modelling system can perform clustering of 3D coordinate paths on or around the 3D model. A 3D coordinate path is a path between one or more points in a 3D space defined by 3D axes, e.g., x, y, and z axes. The modelling system can determine one or more coordinate paths based on images presented on a display. For instance, the data for the images may indicate that a device presented images centered on coordinates point p1=(x1, y1, z1), point p2=(x2, y2, z2), and then point p3=(x3, y3, z3). Using this data, the modelling system can determine a coordinate path that includes point p1, point p2, and then point p3. The modelling system can determine multiple coordinate paths for different viewer sessions.

The modelling system can categorize regions of a 3D model using the coordinate paths. For instance, the modelling system can identify regions of the 3D model with fewer clusters of coordinate paths as non-focal regions. The modelling system can identify regions of the 3D model with more clusters of coordinate paths as focal regions.

The modelling system can aggregate multiple coordinate paths, e.g., from multiple viewers or multiple viewing sessions, to create a path for a 3D focal density cone. The 3D focal density cone can represent an optimal viewing angle for presentation of an image of the 3D model. The path can include multiple 3D focal density cones that each represent an optimal viewing angle for different portions of the 3D model. The modelling system can determine the regions included in the 3D focal density cone. The modelling system can categorize the regions included in the 3D focal density cone as focal regions, determine to skip optimization of those focal regions, or both. The modelling system can categorize the regions not included in the 3D focal density cone as non-focal regions, optimize those non-focal regions, or both.

Figure 4:
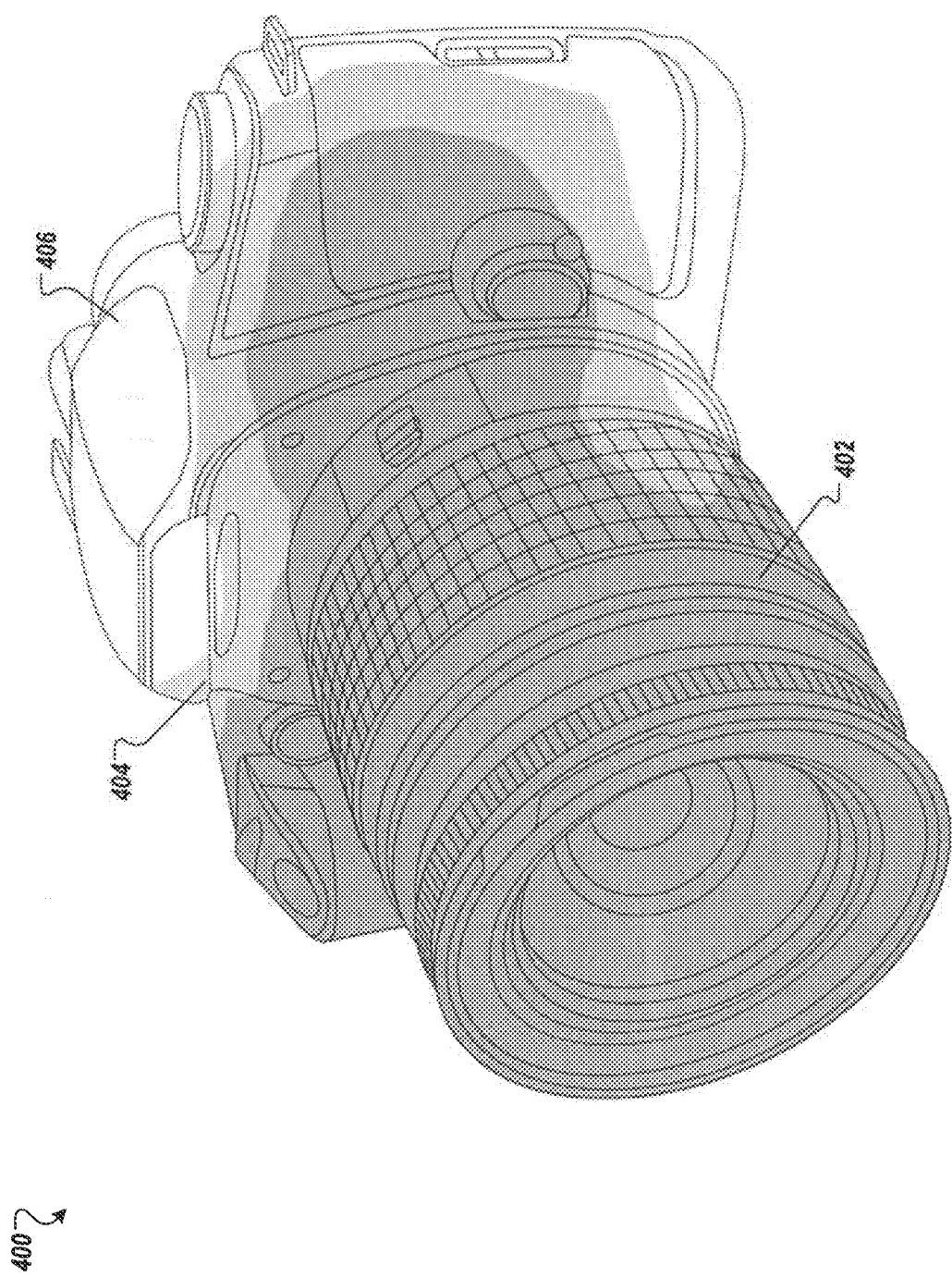
FIG. 4 is an example illustration of a heat map that depicts aggregated viewing data for a processed 3D model.

FIG. 4 is an example illustration of a heat map 400 that depicts aggregated viewing data for a processed 3D model. The heat map 400 can represent a quantity of times each point in the 3D model is a potential focal point, a weight for a potential focal point, or both. For instance, each point in the 3D model in the darkest shaded region 402 can satisfy at least a first threshold likelihood for a potential focal point. The threshold likelihood can be a quantity, e.g., a large number of images have the point as a potential focal point, or a percentage, e.g., 10.25 percent of images have the point as a potential focal point, to name a few examples. Each point in the 3D model in the medium shaded darkness region 404 does not satisfy the first threshold likelihood but satisfies a second threshold likelihood for a potential focal point.

For example, each point in the medium shaded darkness region 404 can have more than a lower threshold percentage but less than a greater threshold percentage, e.g., can be a potential focal point in more than 15 percent but less than 25 percent of images. Each point in the 3D model in the lightest shaded region 406 does not satisfy the second threshold likelihood or the first threshold likelihood. In some examples, the heat map 400 may include only one threshold likelihood or more than two threshold likelihoods.

The modelling system can categorize the lightest shaded region 406 as a non-focal region, since the points in the lightest shaded region 406 do not satisfy the second threshold likelihood for a potential focal point. The modelling system can categorize the darkest shaded region 402 and the medium shaded darkness region 404 as focal regions, since regions 402 and 404 satisfy one or both of the first threshold likelihood or the second threshold likelihood.

When the modelling system has multiple threshold likelihood, the modelling system can include multiple "focal region" categorizations. For instance, the modelling system can use a medium focal region categorization for the medium shaded darkness region 404 and a high focal region categorization for the darkest shaded region 402.

The modelling system can categorize the regions, the points, or both. For example, the modelling system can categorize the points in the lightest shaded region 406 as non-focal points, e.g., along with or in addition to categorizing the lightest shade region 406 as a non-focal region. The modelling system can categorize the points in the darkest shaded region 402 as focal points, e.g., along with or in addition to categorizing the darkest shade region 402 as a focal region.

The modelling system can normalize values for each of the points in the 3D model. For instance, the modelling system can determine a highest value for the points in the 3D image, e.g., a highest quantity of times a point is a potential focal point. The modelling system can use the highest quantity of times to normalize values for each of the points in the 3D model. For instance, when a first point in the 3D model is a potential focal point in one hundred images, and a second point in the 3D model is a potential focal point in sixty-three images, the modelling system can assign the first point a normalized value of 1.0 and the second point a normalized value of 0.63. The modelling system can use the normalized values to generate the heat map.

In some examples, from the multiple potential focal points, the modelling system can select or determine to skip selection of a first subset of potential focal points that each have at least the normalized threshold likelihood of being a focal point. The first subset of potential focal points can include the points in the darkest shaded region 402. The modelling system can select or determine to skip selection of a second subset of potential focal points 314 that each do not have at least the threshold likelihood of being a focal point. The second subset of potential focal points can include the points in the lightest shaded region 406. The modelling system can store the selected focal points, for example, in the focal point database 150 of the environment 100.

Returning to FIG. 2, in response to determining that the potential focal point does not have at least the threshold likelihood of being a focal point, the modelling system categorizes the potential focal point as not a focal point (208). For instance, with reference to FIG. 4, the modelling system determines, for each of the points in the lightest shaded region 406, that the point is not a focal point. To categorize the potential focal point as not a focal point, the modelling system can select or determine to skip selection of the potential focal point. When selecting the potential focal point, the modelling system can select a group of potential points that are each not focal points.

The modelling system determines to optimize non-focal regions that include the points that are not focal points by reducing a resolution of textures included in non-focal regions (210). The modelling system can optimize the non-focal regions using, for example, the model optimization device 165 of the environment 100. The modelling system can determine to optimize non-focal regions by reducing a resolution of textures included in non-focal regions. For example, in FIG. 4, the modelling system can optimize region 406 by reducing resolutions of textures included in region 406. By reducing resolutions of textures included in region 406, the modelling system can reduce the required storage space, bandwidth required to transfer the data, or both, for points in region 406.

In response to determining that the potential focal point has at least a threshold likelihood of being a focal point, the modelling system categorizes the potential focal point as a focal point (212). For instance, with reference to FIG. 4, the modelling system determines, for one or more of the points in the darkest shaded region 402, that the point is a focal point. To categorize the potential focal point as a focal point, the modelling system can select the potential focal point as a focal point or determine to skip selection of the potential focal point, e.g., and only select points that are not focal points. When selecting the potential focal point, the modelling system can select a group of potential focal points that are each focal points.

The modelling system determines to skip optimization of focal regions that include the points that are focal points (214). For example, in FIG. 4, the modelling system can determine to skip optimization of regions 402 and 404, since regions 402 and 404 are focal regions that include points that are focal points. By skipping optimization of regions 402 and 404, the modelling system maintains the high resolution of the textures in regions 402 and 404. Maintaining the high resolution of content in the regions 402, 404, or both, may improve a visual presentation of the content in the regions 402, 404, or both.

In some implementations, the modelling system can use a graded approach to optimizing regions of a 3D model. For example, region 404 has fewer focal points than region 402, but does include at least one focal point. The modelling system can reduce the resolution of textures in region 404 to a resolution lower than the resolution of textures in region 402, but higher than the resolution of textures in region 406.

In some implementations, the modelling system can reduce the resolution of textures in all regions, to varying degrees. For example, if the available storage space, the network bandwidth, or both, are limited, the modelling system can determine to optimize, or partially optimize, both focal regions and non-focal regions. For example, the resolution of textures in region 406 may be reduced to a resolution that is lower than the original 3D model resolution, but higher than the optimized resolutions of regions 404 and 406.

For either branch of the above determination at step 206, the modelling system can generate an optimized 3D model using the focal and the non-focal regions (216). For example, the modelling system can generate a 3D model that has higher resolution textures for the focal regions, and lower resolution textures, e.g., reduced resolution textures, for the non-focal regions. The modelling system can generate the 3D model using data for the focal regions, data for the non-focal regions, or both. The combined focal and non-focal regions form an optimized 3D model with a smaller size than the original 3D model. In some examples, instead of or in addition to generating the optimized 3D model, the modelling system can store data for the focal regions and the non-focal regions in memory.

Figure 5:
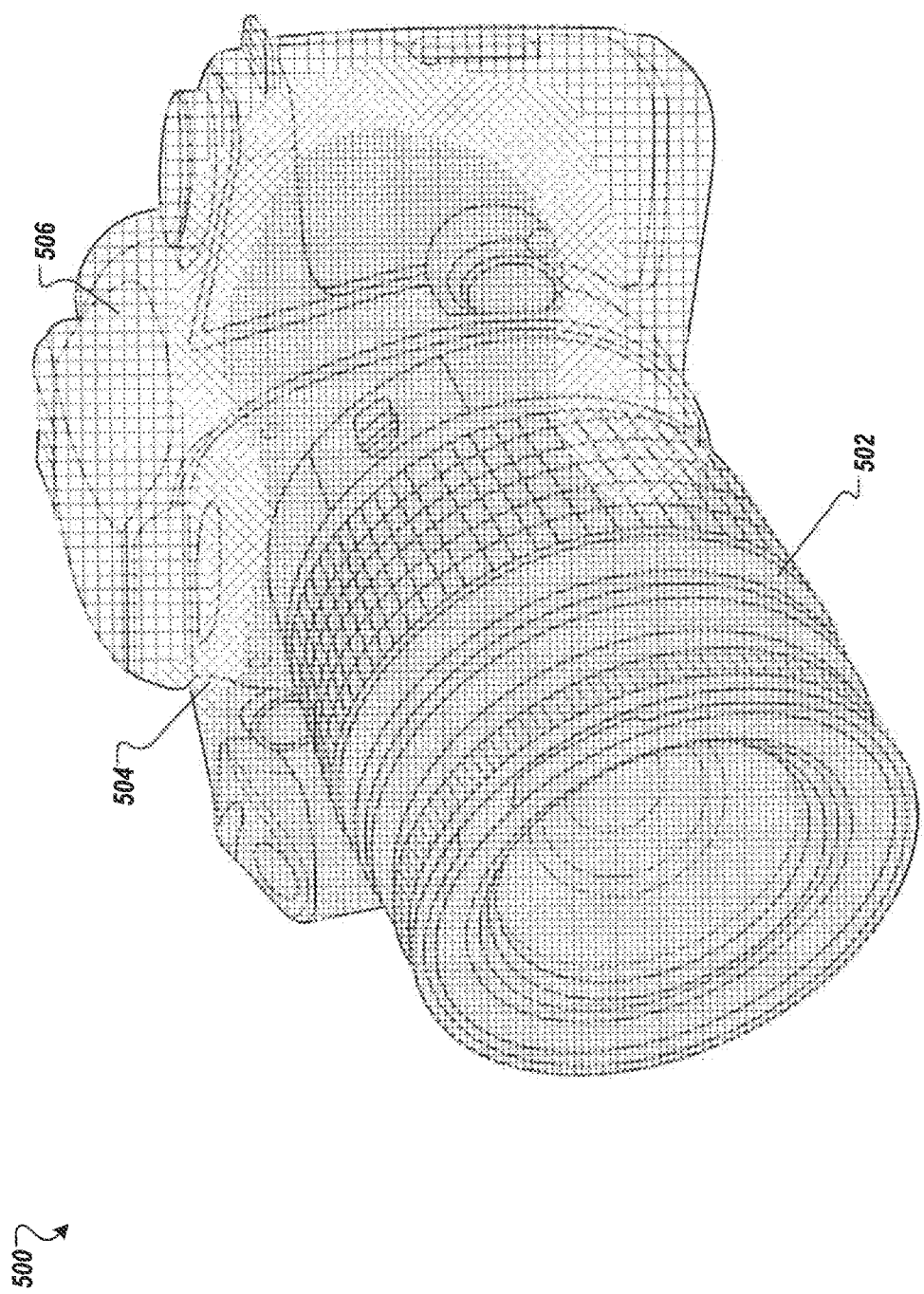
FIG. 5 is an example illustration of an optimized 3D model with higher and lower resolution regions.

FIG. 5 is an example illustration of an optimized 3D model 500 with higher and lower resolution regions. Region 502 is a higher resolution region, e.g., that corresponds to a focal region. In some examples, the modelling system has not optimized region 502 or has optimized region 502 to a lesser degree than a lower resolution region. Therefore, region 502 can be a region with the highest resolution of textures, or potentially one of multiple regions with a highest resolution of textures. Region 504 is a region with a lower resolution of textures than region 502, due to partial optimization of the content depicted in the region 504. The region 504 can correspond to a focal region that does not have as high of a resolution as the region 502. Region 506 is a lowest resolution region, e.g., that corresponds to a non-focal region. The modelling system has optimized region 506 to have the lowest resolution of textures for the 3D model 500. In regions with reduced resolution, the quality of one or more textures or other content is reduced, compared to the quality of the corresponding textures or other content in the original 3D model. The resulting optimized 3D model 500 has a smaller size than the original 3D model.

The 3D model may have one or more of each type of region. For instance, the 3D model may have two focal regions and three non-focal regions. The two focal regions can be non-contiguous, e.g., separated by one or more of the non-focal regions. Some or all of the three non-focal regions can be non-contiguous, e.g., separated by one or more of the two focal regions.

The modelling system stores the optimized 3D model in a non-volatile memory (218). Generation of lower quality, optimized 3D models can enable a modelling system to reduce storage requirements for a 3D model, reduce network usage, e.g., when transmitting a 3D model to another device or system, or both.

The order of steps in the process 200 described above is illustrative only, and 3D model optimization can be performed in different orders. For example, when the modelling system stores the optimized 3D model in a non-volatile memory (218), the modelling system may determine that the size of the optimized 3D model is still too large for transmitting to a device, based on, e.g., available network bandwidth for a device that requested the 3D model. The modelling system may then determine to optimize additional regions of the 3D model by reducing resolutions of textures included in the regions (210). The modelling system can then re-generate an optimized 3D model including focal and non-focal regions (216). In this example, the modelling system can select a number of thresholds, a degree of optimization, or both, based on a maximum size for the optimized 3D model.

In some implementations, the process 200 can include additional steps, fewer steps, or some of the steps can be divided into multiple steps. For example, the modelling system can perform steps 204, 208, 212, 216, and 218 without performing the other steps in the process 200. In some examples, the modelling system can perform steps 204, 208, and 216 without performing the other steps in the process 200.

In some implementations, the modelling system can retrieve images of an object that depict at least a view of the object that was generated on a display for presentation to a viewer (202) after one viewer interaction, several viewer interactions, or many viewer interactions. In some implementations, the modelling system can retrieve images of the object at designated time intervals. In some implementations, the modelling system can retrieve images of the object when triggered by an event. For example, the modelling system can retrieve images of the object upon receipt of the model request, e.g., the model request 125 from the environment 100.

In some implementations, the determination to skip optimization of focal regions (214) can include the determination to optimize one or more focal regions to various degrees. For example, the modelling system may determine to partially optimize a focal region that includes a small number of focal points. The modelling system can reduce the resolution of textures in the focal region to a resolution lower than the resolution of textures in focal regions with more focal points, but higher than the resolution of textures in non-focal regions.

The modelling system can use any appropriate data that indicates a portion of a view of the object that was generated on a display for presentation to a viewer, e.g., instead of or in addition to an image. In some implementations, the device may capture coordinates of the 3D model that indicate a view of the model that was presented to a viewer. The modelling system can receive data for the coordinates from the device, e.g., data for x-y-z coordinates. The modelling system can use the data for the coordinates for the process 200.

In some implementations, the modelling system can use the weight threshold with the weighted focal point graph, weighted region graph, or both, to determine content to optimize. For example, the modelling system can overlay the focal point weights, regions, or both, onto the 3D model to determine a hierarchy of meshes, textures, or both in the regions of the 3D model. The modelling system can use the hierarchy of meshes, textures, or both, to determine to optimize meshes and textures of 3D model regions. For instance, when the overlay on the 3D model indicates that a region does not include any focal point weights that satisfy the threshold weight, the modelling system can categorize that region as a non-focal region, e.g., related to steps 208 and 210. When a region includes a focal point weight that satisfies the threshold weight, the modelling system can categorize that region as a focal region, e.g., related to steps 212 and 214.

When overlaying a region onto the 3D model, the modelling system can first determine whether a region is a focal region or a non-focal region. The modelling system can then select, for optimization, the meshes, textures, or both, from the overlaid 3D model that are included in the non-focal regions, e.g., related to steps 208 and 210. The modelling system can determine to skip selection, or perform another appropriate process, for the meshes, textures, or both, from the overlaid 3D model that are included in the focal regions, e.g., related to steps 212 and 214.

In some implementations, the modelling system may be part of a device that presents a 3D model. For instance, an application, e.g., the modelling system, on the device may dynamically render optimized or non-optimized regions of a 3D model. The application may include both the modelling system and a rendering system. In some examples, when the application is a web browser, the application may use JavaScript. The modelling system can use weighted focal points, e.g., a weighted focal point graph, to intelligently pre-cache data for regions of the 3D model, render data for regions of the 3D model, or both.

For instance, the modelling system may retrieve a 3D model from a server. The 3D model may include higher quality data for focal regions that will initially be presented on a display. The 3D model may include lower quality data for non-focal regions that will not be initially presented on the display. The model may include high quality data for the non-focal regions. In some examples, the modelling system may receive the high quality data for the non-focal regions separately from the model, e.g., upon request or after receipt of the model.

When the device first renders the 3D model, the device can use an optimized 3D model with the higher quality data used to generate an image for the display and the lower quality data used to generate the portions of the 3D model that are not initially presented. This lower quality data may include only meshes without any textures. As the device receives user input, the device can dynamically determine which regions have at least a threshold likelihood of being displayed and render higher quality data for those regions. The device can retrieve the higher quality data for these regions from a cache, dynamically request higher quality data from the server, or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 6:
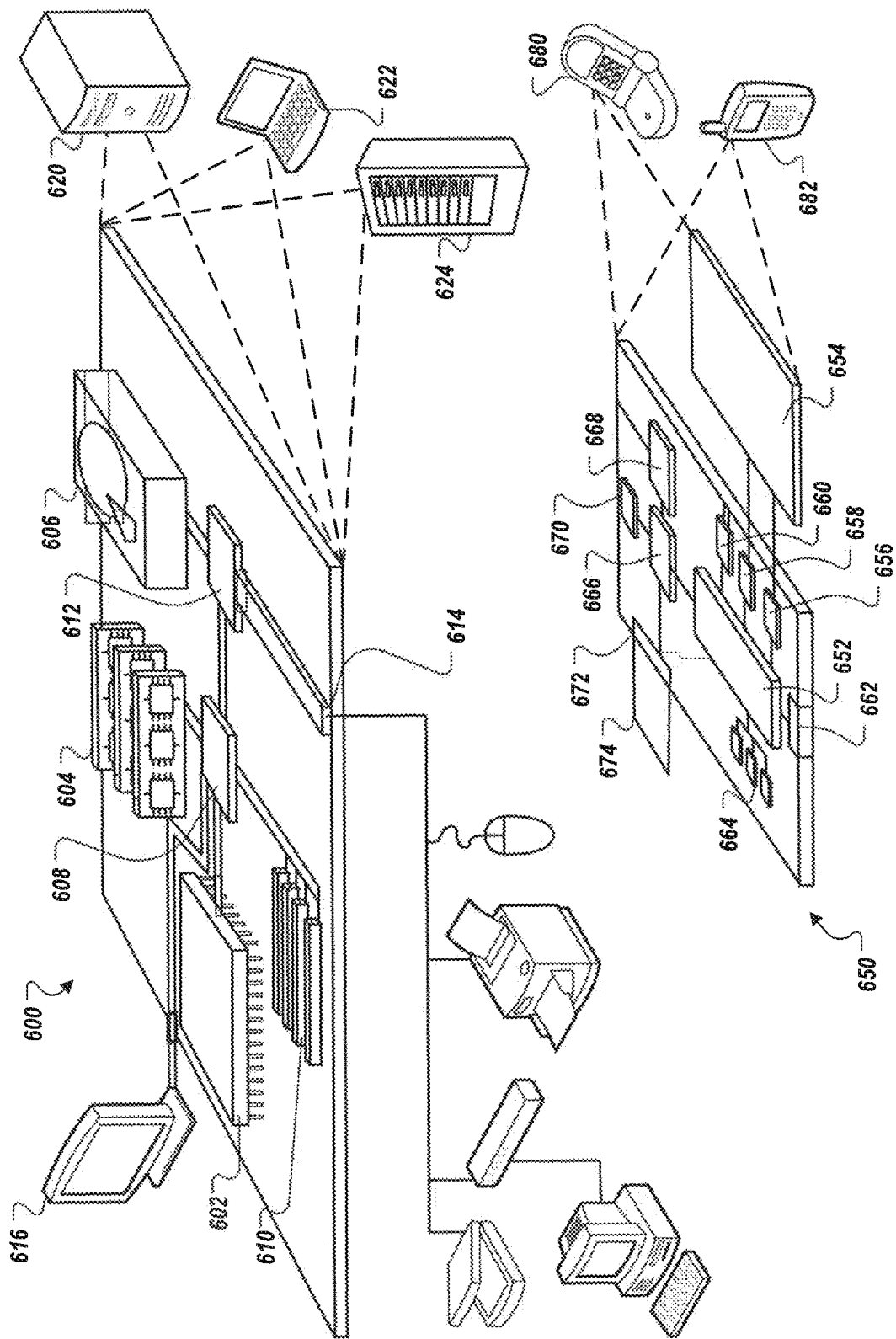
FIG. 6 is a block diagram of a computing system that can be used in connection with computer-implemented methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices on which are stored instructions that are operable, when executed by the one or more computers, to cause the one or more computers to perform operations comprising:

obtaining, from a database, a three-dimensional model of an object, the three-dimensional model of the object being stored in a file that has an initial file size, wherein different portions of the three-dimensional model are represented by images having different image resolutions, and wherein a particular portion of the three-dimensional model is represented by a particular image having an initial image resolution;

obtaining historical user interaction data that, for different past users, indicates a sequence of rotation operations or zoom operations that the past user performed when viewing the three-dimensional model;

determining, based on the historical user interaction data, that the particular portion of the three-dimensional model has a lower likelihood of being associated with a rotation operation or a zoom operation in the historical user interaction data than one or more other portions of the three-dimensional model of the object;

in response to determining that the particular portion of the three-dimensional model has a lower likelihood of being associated with a rotation operation or a zoom operation in the historical interaction data than one or more other portions of the three-dimensional model of the object, generating an updated image for the particular portion that has a reduced image resolution in comparison to the initial image resolution of the particular image;

generating, then storing, in the database, an optimized three-dimensional model that includes the updated image for the particular portion that has the reduced image resolution instead of the particular image that has the initial image resolution, the optimized three-dimensional model being stored in a file that has a second file size that is smaller than the first file size; and providing, in response to a user device requesting the three-dimensional model of the object, the optimized three-dimensional model for an initial presentation, by the user device, of one or more portions of the optimized three-dimensional model other than the particular portion while the particular portion, having a lower likelihood of being associated with a rotation operation or a zoom operation than the one or more portions of the optimized three-dimensional model, is not presented.

2. The system of claim 1, wherein determining that the particular portion of the three-dimensional model has a lower likelihood of being associated with a rotation operation or a zoom operation in the historical interaction data comprises:

determining that fewer than a threshold number of the different past users have rotated the three-dimensional model to place the particular portion into view.

3. The system of claim 1, wherein determining that the particular portion of the three-dimensional model has a lower likelihood of being associated with a rotation operation or a zoom operation in the historical interaction data comprises:

determining that fewer than a threshold number of the different past users have zoomed in on the particular portion of the three-dimensional model.

4. The system of claim 1, wherein the updated image shows a texture of the particular portion of the three-dimensional model with less detail than the particular image.

5. The system of claim 1, wherein determining that the particular portion of the three-dimensional model has a lower likelihood of being associated with a rotation operation or a zoom operation in the historical interaction data comprises:

determining that the particular portion of the three-dimensional model was not an area of focus for most of the different past users.

6. The system of claim 1, wherein determining that the particular portion of the three-dimensional model has a lower likelihood of being associated with a rotation operation or a zoom operation in the historical interaction data comprises:

generating a heat map for various portions of the three-dimensional model, and determining, based on the heat map, that the particular portion of the three-dimensional model is an area of the three-dimensional model which the different past users infrequently viewed.

7. The system of claim 1, wherein, for each of the different past users, the historical user interaction data further indicates an amount of time associated with each rotation operation or zoom operation.

8. The system of claim 1, wherein providing the optimized three-dimensional model for the initial presentation comprises providing the optimized three-dimensional model for presentation at an orientation in which the particular portion of the optimized three-dimensional model is occluded by one or more portions of the optimized three-dimensional model other than the particular portion.

9. A computer-implemented method comprising:

obtaining, from a database, a three-dimensional model of an object, the three-dimensional model of the object being stored in a file that has an initial file size, wherein different portions of the three-dimensional model are represented by images having different image resolutions, and wherein a particular portion of the three-dimensional model is represented by a particular image having an initial image resolution;

obtaining historical user interaction data that, for different past users, indicates a sequence of rotation operations or zoom operations that the past user performed when viewing the three-dimensional model;

determining, based on the historical user interaction data, that the particular portion of the three-dimensional model has a lower likelihood of being associated with a rotation operation or a zoom operation in the historical user interaction data than one or more other portions of the three-dimensional model of the object;

in response to determining that the particular portion of the three-dimensional model has a lower likelihood of being associated with a rotation operation or a zoom operation in the historical interaction data than one or more other portions of the three-dimensional model of the object, generating an updated image for the particular portion that has a reduced image resolution in comparison to the initial image resolution of the particular image;

generating, then storing, in the database, an optimized three-dimensional model that includes the updated image for the particular portion that has the reduced image resolution instead of the particular image that has the initial image resolution, the optimized three-dimensional model being stored in a file that has a second file size that is smaller than the first file size; and providing, in response to a user device requesting the three-dimensional model of the object, the optimized three-dimensional model for an initial presentation, by the user device, of one or more portions of the optimized three-dimensional model other than the particular portion while the particular portion, having a lower likelihood of being associated with a rotation operation or a zoom operation than the one or more portions of the optimized three-dimensional model, is not presented.

10. The method of claim 9, wherein determining that the particular portion of the three-dimensional model has a lower likelihood of being associated with a rotation operation or a zoom operation in the historical interaction data comprises:
determining that fewer than a threshold number of the different past users have rotated the three-dimensional model to place the particular portion into view.

11. The method of claim 9, wherein determining that the particular portion of the three-dimensional model has a lower likelihood of being associated with a rotation operation or a zoom operation in the historical interaction data comprises:
determining that fewer than a threshold number of the different past users have zoomed in on the particular portion of the three-dimensional model.

12. The method of claim 9, wherein the updated image shows a texture of the particular portion of the three-dimensional model with less detail than the particular image.

13. The method of claim 9, wherein determining that the particular portion of the three-dimensional model has a lower likelihood of being associated with a rotation operation or a zoom operation in the historical interaction data comprises:
determining that the particular portion of the three-dimensional model was not an area of focus for most of the different past users.

14. The method of claim 9, wherein determining that the particular portion of the three-dimensional model has a lower likelihood of being associated with a rotation operation or a zoom operation in the historical interaction data comprises:
generating a heat map for various portions of the three-dimensional model, and
determining, based on the heat map, that the particular portion of the three-dimensional model is an area of the three-dimensional model which the different past users infrequently viewed.

15. The method of claim 9, wherein, for each of the different past users, the historical user interaction data further indicates an amount of time associated with each rotation operation or zoom operation.

16. The method of claim 9, wherein providing the optimized three-dimensional model for the initial presentation comprises providing the optimized three-dimensional model for presentation at an orientation in which the particular portion of the optimized three-dimensional model is occluded by one or more portions of the optimized three-dimensional model other than the particular portion.

17. A non-transitory computer storage medium encoded with instructions that, when executed by one or more computers, cause the one or more computers to perform operations comprising:
obtaining, from a database, a three-dimensional model of an object, the three-dimensional model of the object being stored in a file that has an initial file size, wherein different portions of the three-dimensional model are represented by images having different image resolutions, and wherein a particular portion of the three-dimensional model is represented by a particular image having an initial image resolution;
obtaining historical user interaction data that, for different past users, indicates a sequence of rotation operations or zoom operations that the past user performed when viewing the three-dimensional model;
determining, based on the historical user interaction data, that the particular portion of the three-dimensional model has a lower likelihood of being associated with a rotation operation or a zoom operation in the historical user interaction data than one or more other portions of the three-dimensional model of the object;
in response to determining that the particular portion of the three-dimensional model has a lower likelihood of being associated with a rotation operation or a zoom operation in the historical interaction data than one or more other portions of the three-dimensional model of the object, generating an updated image for the particular portion that has a reduced image resolution in comparison to the initial image resolution of the particular image;
generating, then storing, in the database, an optimized three-dimensional model that includes the updated image for the particular portion that has the reduced image resolution instead of the particular image that has the initial image resolution, the optimized three-dimensional model being stored in a file that has a second file size that is smaller than the first file size; and
providing, in response to a user device requesting the three-dimensional model of the object, the optimized three-dimensional model for an initial presentation, by the user device, of one or more portions of the optimized three-dimensional model other than the particular portion while the particular portion, having a lower likelihood of being associated with a rotation operation or a zoom operation than the one or more portions of the optimized three-dimensional model, is not presented.

18. The medium of claim 17, wherein determining that the particular portion of the three-dimensional model has a lower likelihood of being associated with a rotation operation or a zoom operation in the historical interaction data comprises:
determining that fewer than a threshold number of the different past users have rotated the three-dimensional model to place the particular portion into view.

19. The medium of claim 17, wherein determining that the particular portion of the three-dimensional model has a lower likelihood of being associated with a rotation operation or a zoom operation in the historical interaction data comprises:
determining that fewer than a threshold number of the different past users have zoomed in on the particular portion of the three-dimensional model.

20. The medium of claim 17, wherein the updated image shows a texture of the particular portion of the three-dimensional model with less detail than the particular image.

21. The medium of claim 17, wherein determining that the particular portion of the three-dimensional model has a lower likelihood of being associated with a rotation operation or a zoom operation in the historical interaction data comprises:
determining that the particular portion of the three-dimensional model was not an area of focus for most of the different past users.

22. The medium of claim 17, wherein determining that the particular portion of the three-dimensional model has a lower likelihood of being associated with a rotation operation or a zoom operation in the historical interaction data comprises:
  generating a heat map for various portions of the three-dimensional model, and
  determining, based on the heat map, that the particular portion of the three-dimensional model is an area of the three-dimensional model which the different past users infrequently viewed.

23. The medium of claim 17, wherein, for each of the different past users, the historical user interaction data further indicates an amount of time associated with each rotation operation or zoom operation.

24. The medium of claim 17, wherein providing the optimized three-dimensional model for the initial presentation comprises providing the optimized three-dimensional model for presentation at an orientation in which the particular portion of the optimized three-dimensional model is occluded by one or more portions of the optimized three-dimensional model other than the particular portion.

* * * * *